US009442357B2

(12) United States Patent
Ferri et al.

(10) Patent No.: US 9,442,357 B2
(45) Date of Patent: Sep. 13, 2016

(54) SPECTRAL FILTERING OF PHOSPHOR COLOR WHEELS

(71) Applicant: TEXAS INSTRUMENTS INCORPORATED, Dallas, TX (US)

(72) Inventors: John M. Ferri, Allen, TX (US); Gregory S. Pettitt, Farmersville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 374 days.

(21) Appl. No.: 13/660,663

(22) Filed: Oct. 25, 2012

(65) Prior Publication Data

US 2013/0100420 A1   Apr. 25, 2013

Related U.S. Application Data

(60) Provisional application No. 61/551,031, filed on Oct. 25, 2011.

(51) Int. Cl.
| | |
|---|---|
| *G03B 21/20* | (2006.01) |
| *G03B 21/28* | (2006.01) |
| *G03B 21/14* | (2006.01) |
| *G03B 33/08* | (2006.01) |
| *H04N 9/31* | (2006.01) |

(52) U.S. Cl.
CPC .............. *G03B 21/204* (2013.01); *G03B 21/14* (2013.01); *G03B 21/208* (2013.01); *G03B 21/28* (2013.01); *G03B 33/08* (2013.01); *H04N 9/3114* (2013.01); *H04N 9/3158* (2013.01); *H04N 9/3161* (2013.01)

(58) Field of Classification Search
CPC .... G03B 21/14; G03B 21/28; G03B 21/208; G03B 21/204
USPC ........................................................... 353/84
See application file for complete search history.

(56) References Cited

U.S. PATENT DOCUMENTS

| | | | |
|---|---|---|---|
| 7,070,300 B2 | 7/2006 | Harbers et al. | |
| 7,547,114 B2 | 6/2009 | Li et al. | |
| 7,651,243 B2 | 1/2010 | McGuire, Jr. et al. | |
| 8,556,432 B2 * | 10/2013 | Masuda | 353/31 |

(Continued)

FOREIGN PATENT DOCUMENTS

WO     WO 2010133090 A1 *  11/2010  ............. G03B 21/14

*Primary Examiner* — Bao-Luan Le
(74) *Attorney, Agent, or Firm* — Tuenlap D. Chan; Frank D. Cimino

(57) ABSTRACT

A projection light source has a source of laser light of a first color. A first member has first and second phosphor material segments respectively configured to emit light of second and third colors when illuminated by the laser light of the first color. A second member has first and second dichroic filter segments respectively configured to pass the light of the second and third colors emitted by the first and second phosphor material segments, while blocking light of the others of the first, second and third colors. Relative placements of the first and second members are synchronized to periodically align the first member with the laser light source and the second member with the first member, so that the first dichroic filter segment will pass the second color along a path at first time intervals when the second color is emitted by the first phosphor material and the second dichroic filter segment will pass the third color along at least a same portion of the path at second time intervals when the third color is emitted by the second phosphor material.

20 Claims, 17 Drawing Sheets

(56) References Cited

U.S. PATENT DOCUMENTS

| | | | |
|---|---|---|---|
| 8,740,388 B2* | 6/2014 | Okuda et al. | 353/20 |
| 2005/0151936 A1* | 7/2005 | Nonaka | 353/84 |
| 2005/0206855 A1* | 9/2005 | Hori | 353/84 |
| 2008/0117537 A1* | 5/2008 | Lin | 359/892 |
| 2009/0284148 A1* | 11/2009 | Iwanaga | 313/506 |
| 2010/0245777 A1* | 9/2010 | Ogura | 353/38 |
| 2010/0328617 A1* | 12/2010 | Masuda | 353/31 |
| 2010/0328625 A1* | 12/2010 | Miyazaki et al. | 353/85 |
| 2010/0328632 A1* | 12/2010 | Kurosaki et al. | 353/98 |
| 2011/0199580 A1* | 8/2011 | Hirata et al. | 353/31 |
| 2011/0228232 A1* | 9/2011 | Sakata | G02B 7/008 353/31 |
| 2012/0106126 A1* | 5/2012 | Nojima et al. | 362/84 |
| 2014/0028984 A1* | 1/2014 | Osaka | G03B 21/2013 353/31 |
| 2014/0104583 A1* | 4/2014 | Osaka | G03B 21/16 353/84 |

\* cited by examiner

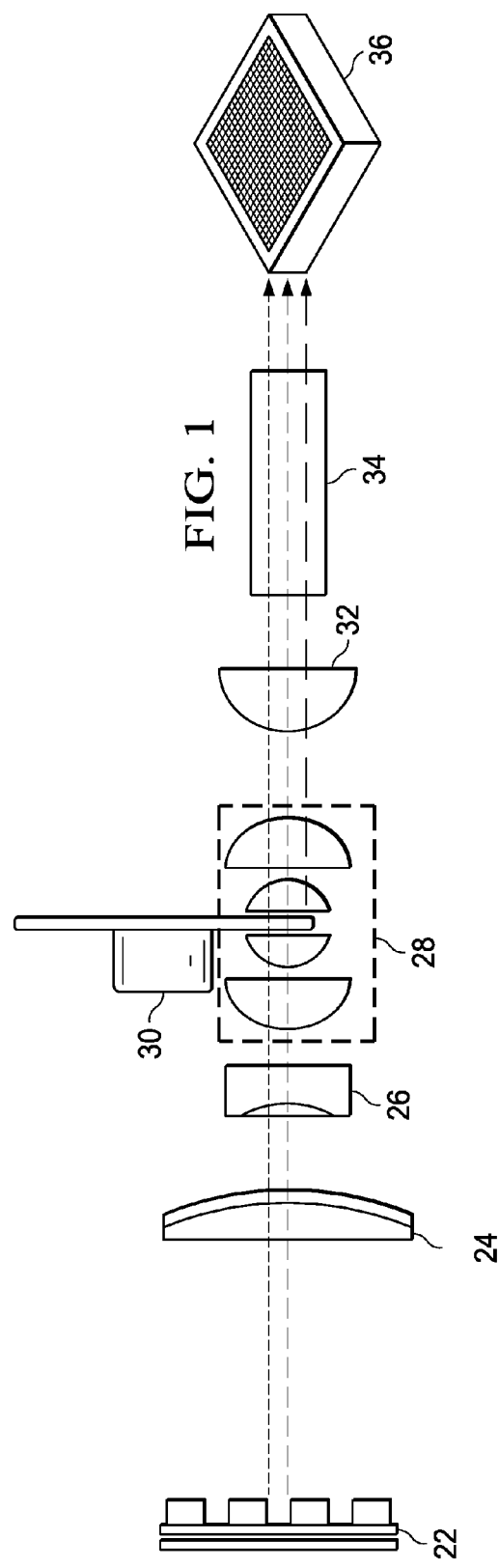
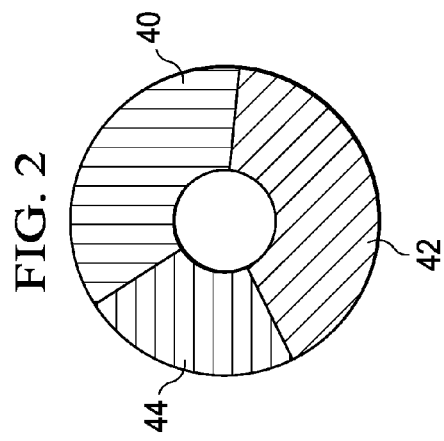
FIG. 1
FIG. 2

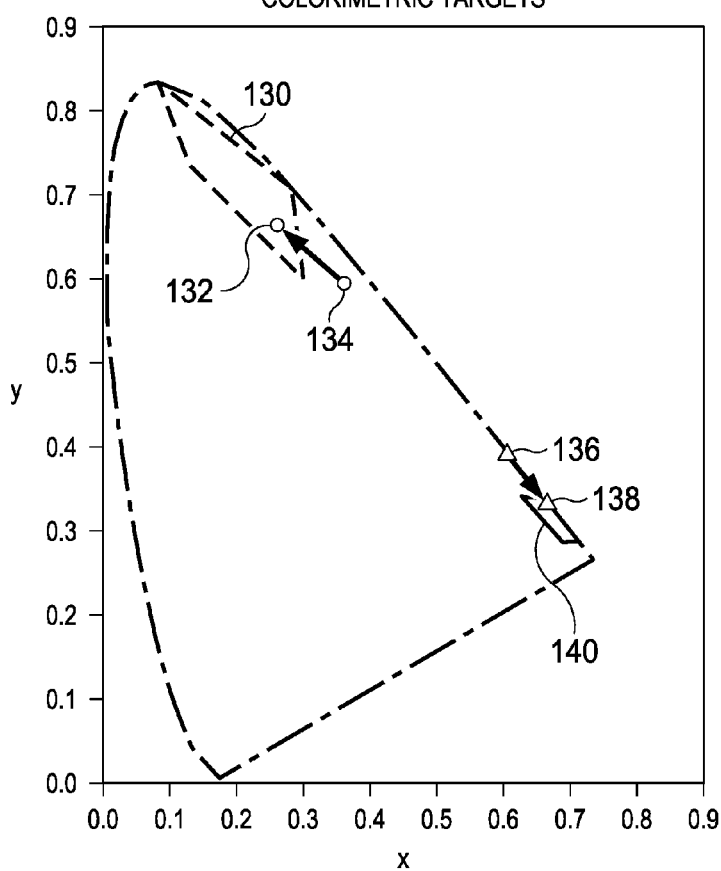
FIG. 10 EXAMPLE PHOSPHOR COLORIMETRIC TARGETS
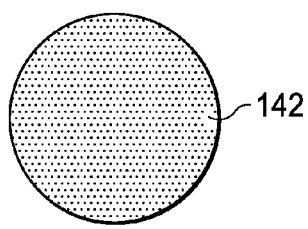
FIG. 11
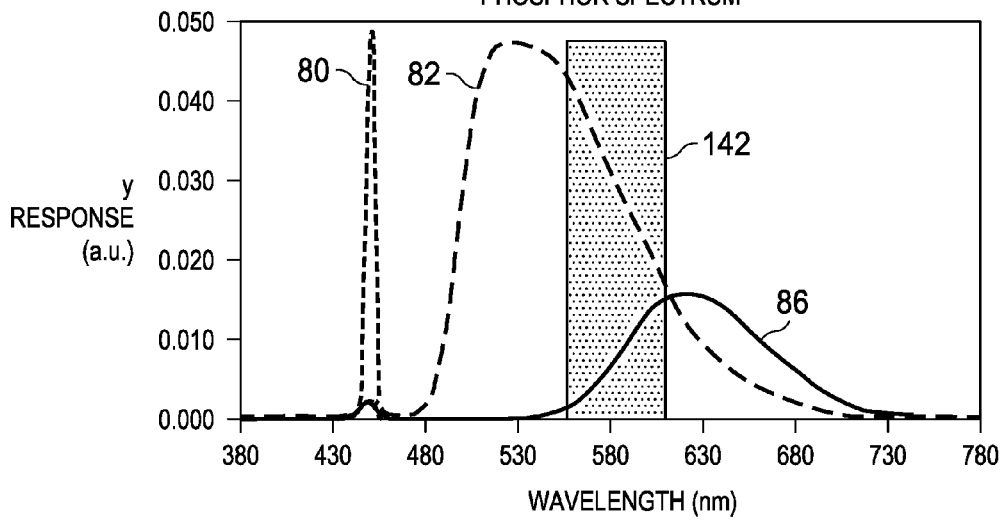
FIG. 12

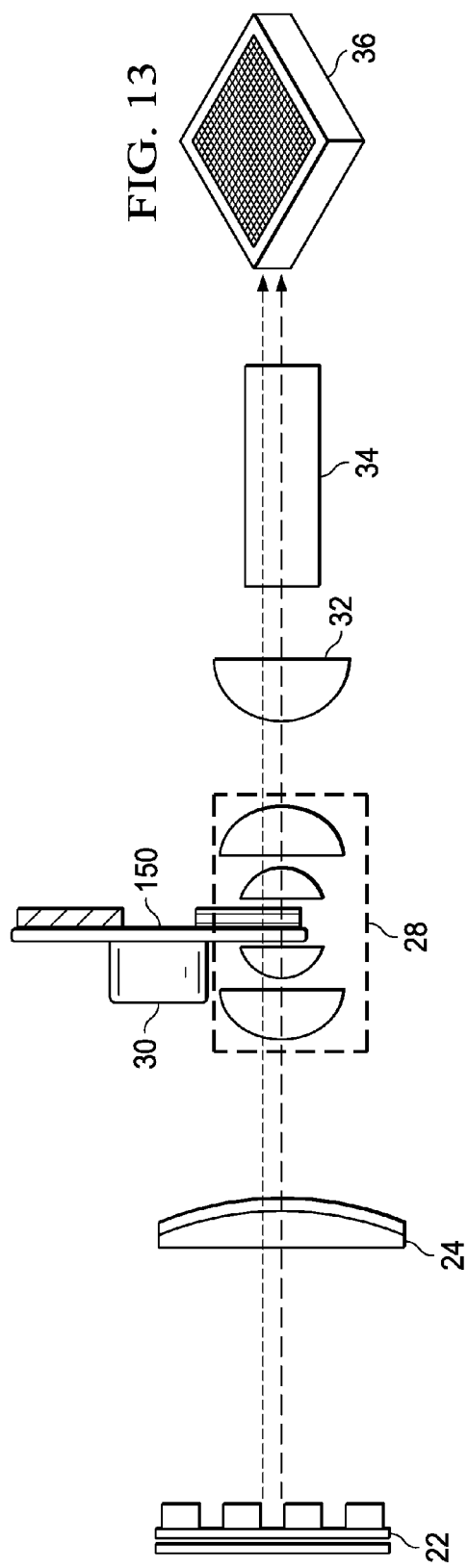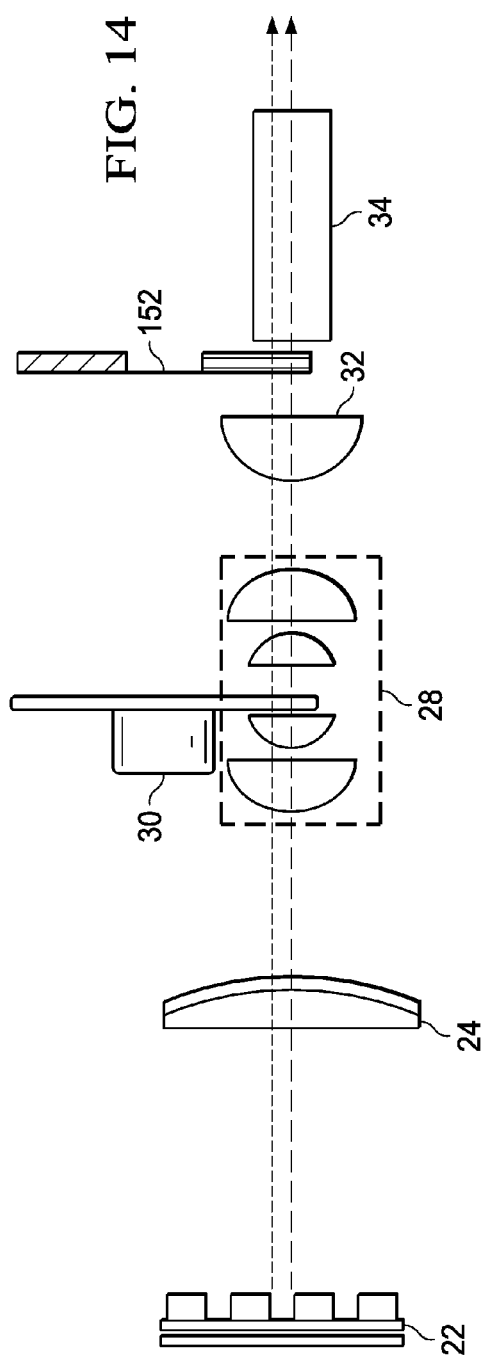

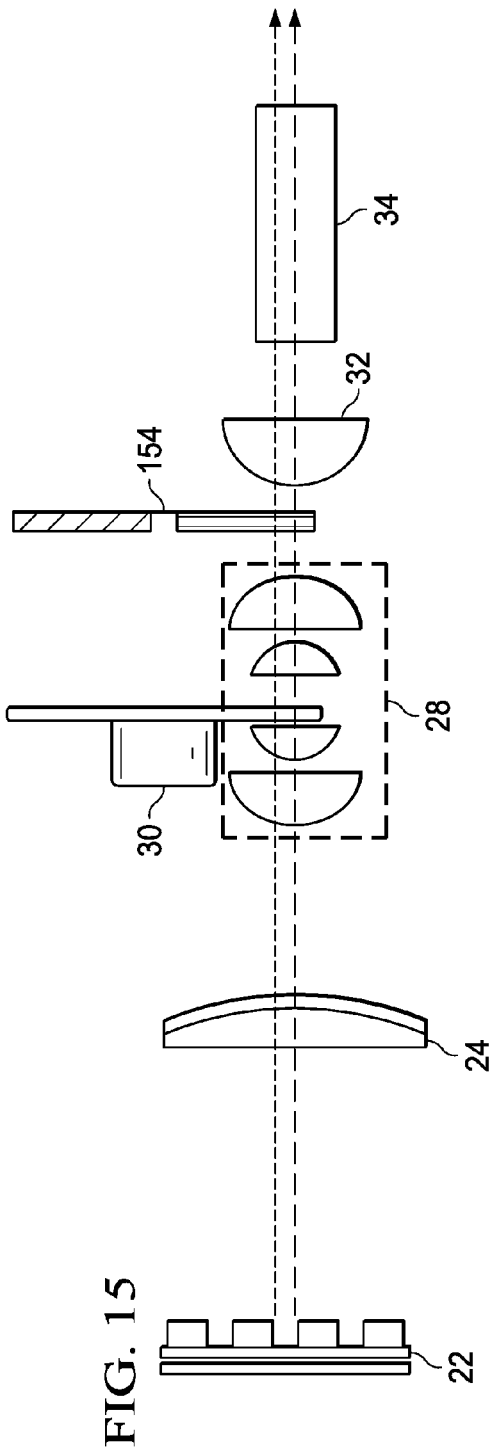
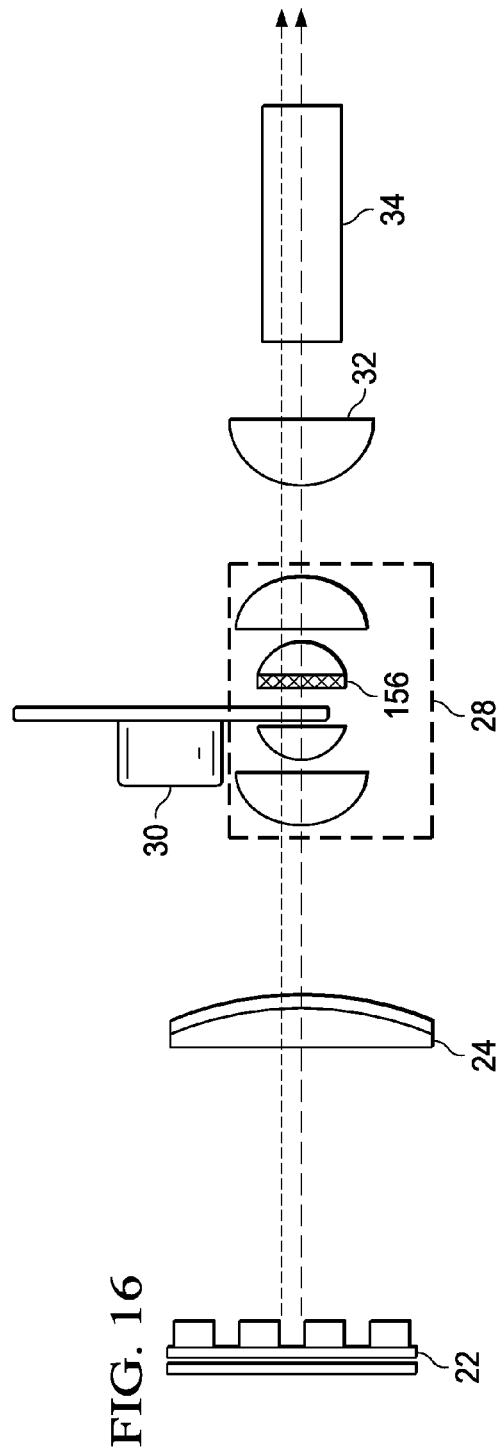

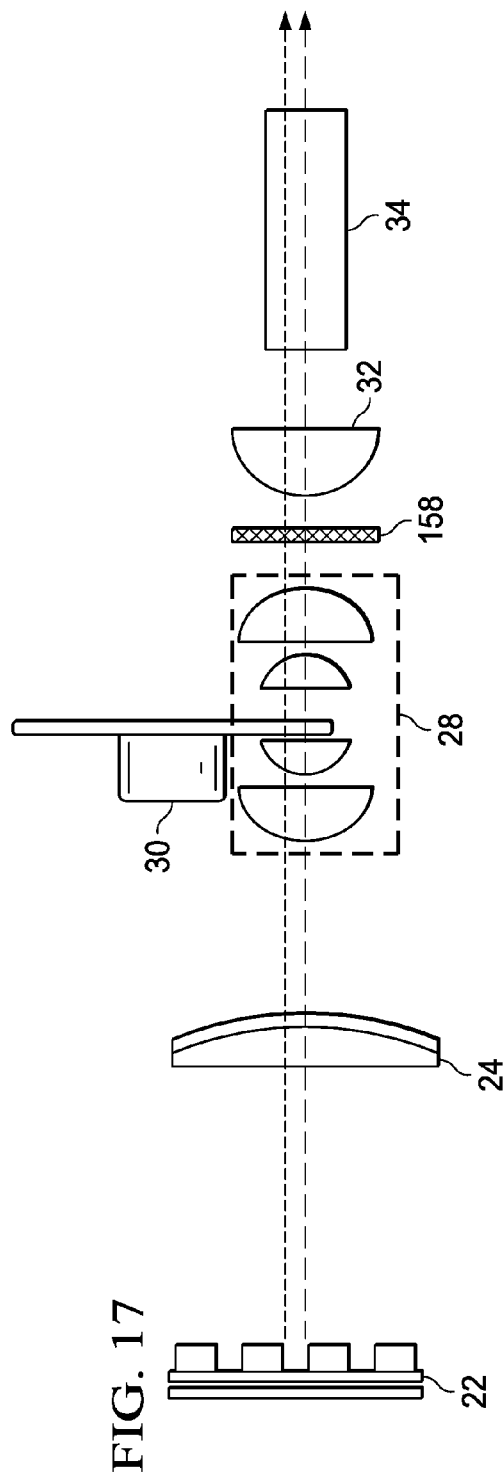
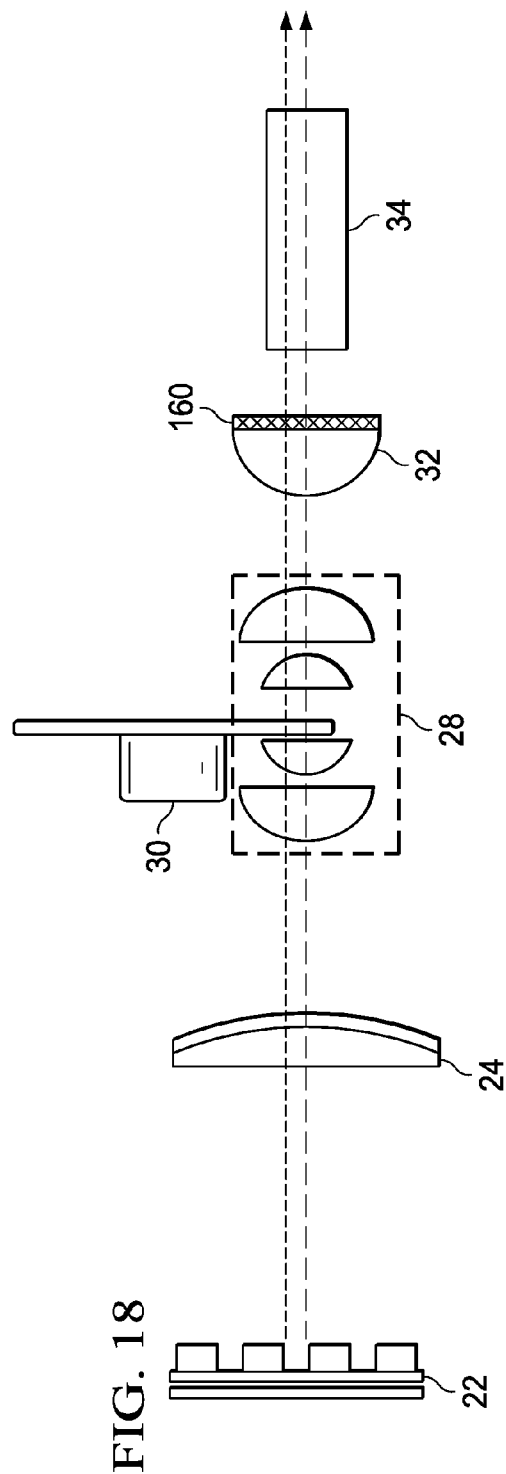

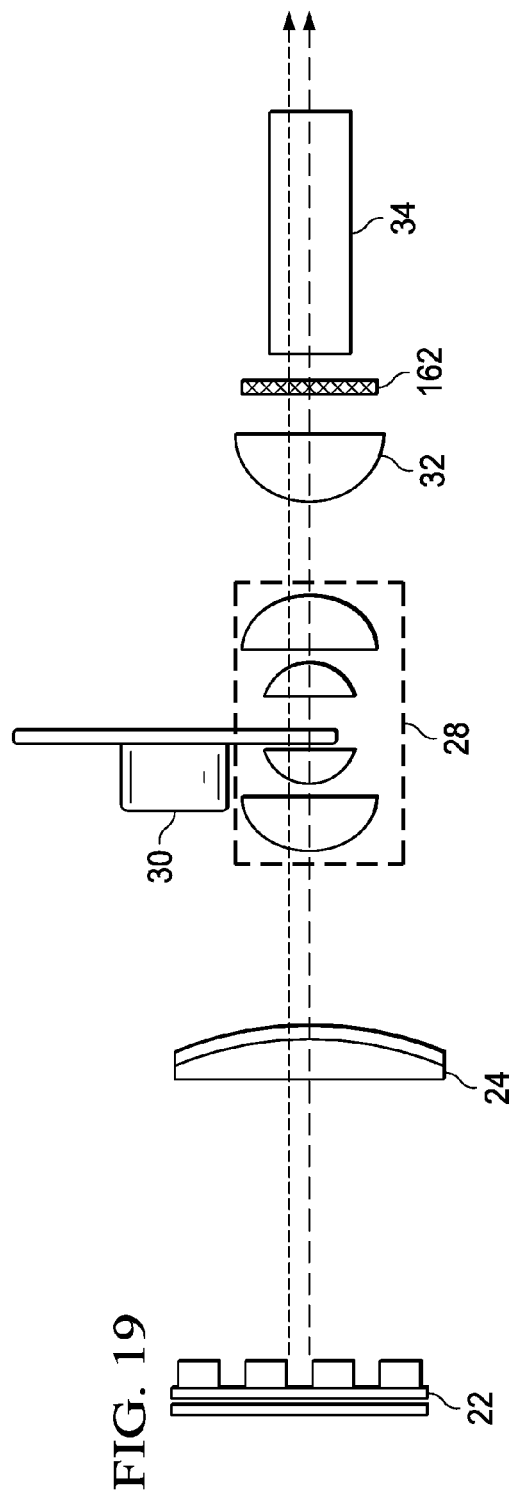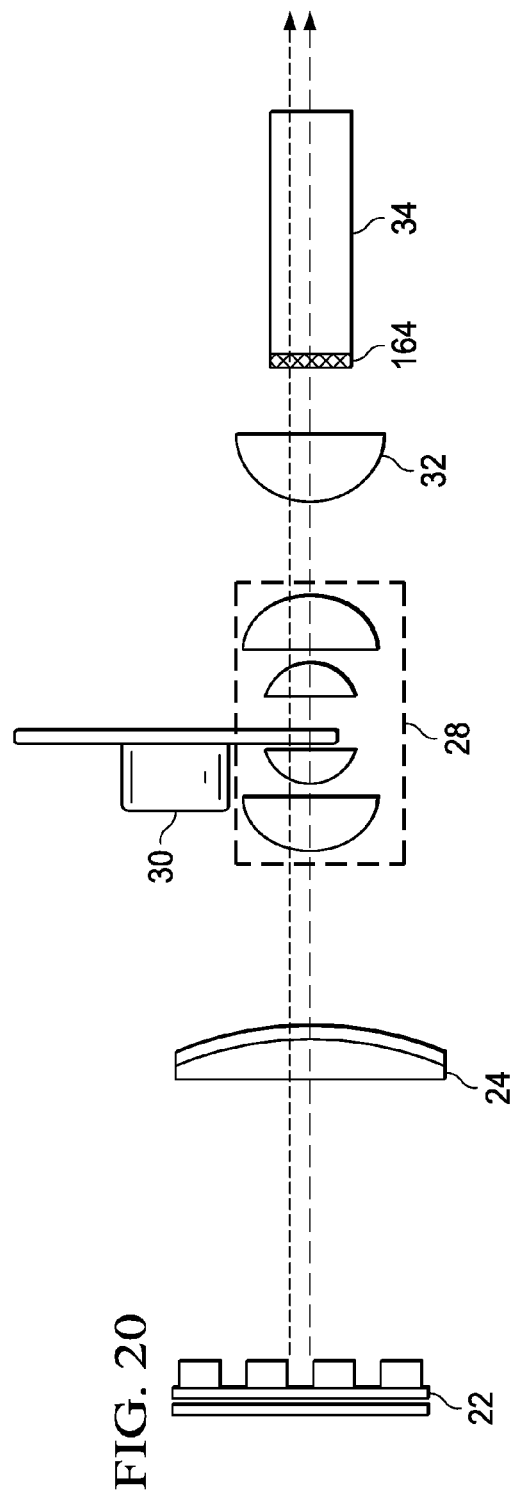

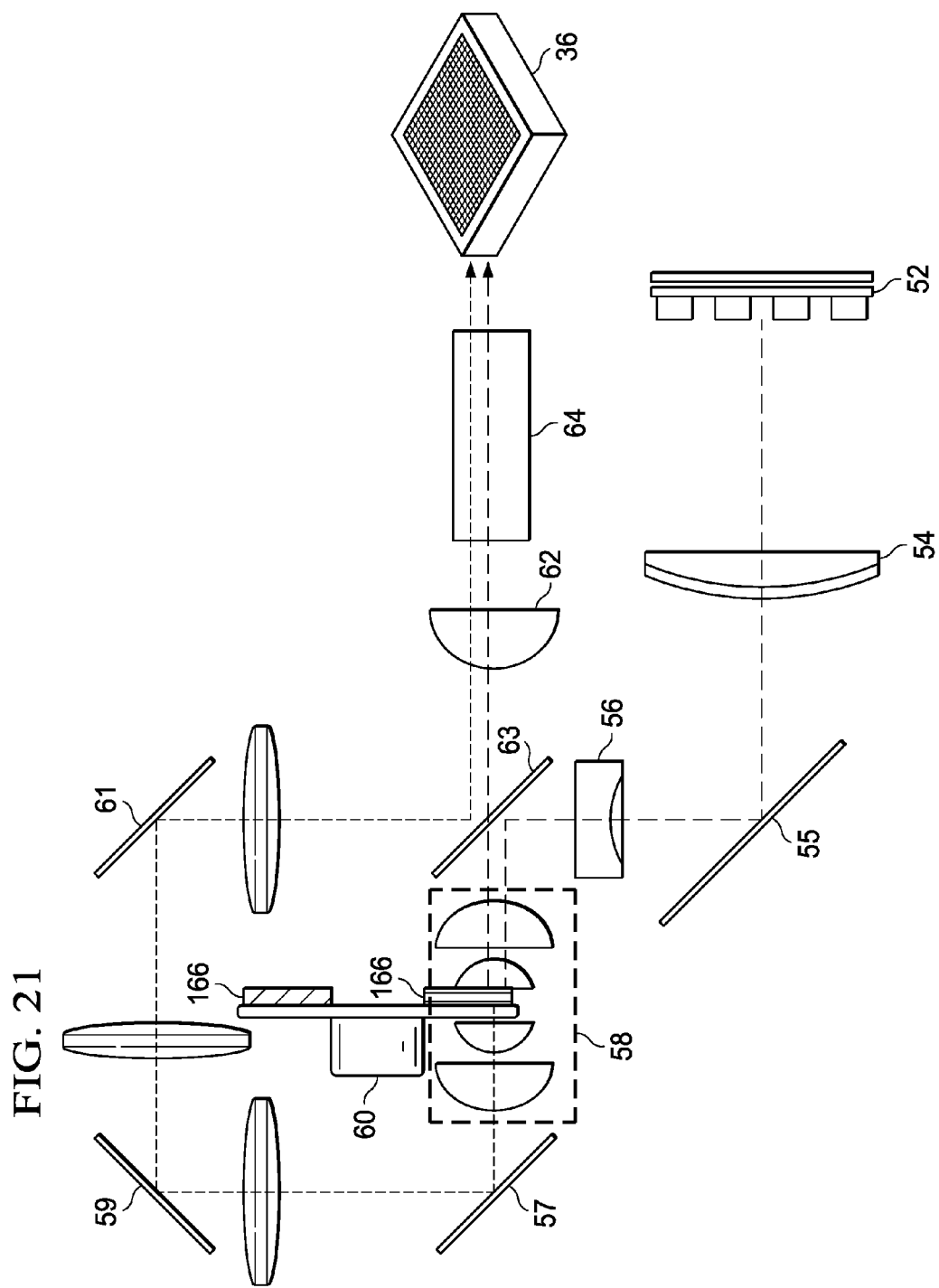

SPECTRAL FILTERING OF PHOSPHOR COLOR WHEELS

This application claims the benefit of Provisional Application No. 61/551,031, filed Oct. 25, 2011, the entirety of which is hereby incorporated by reference.

This relates to phosphor wheel illuminators and, more particularly, to light filters for phosphor wheel illuminators for use, for example, in display systems.

BACKGROUND

An example projection display system is illustrated in FIG. 1. In some projection display systems a white light source 22 sends light through a series of lenses 24, 26, and 28 through a spinning color wheel 30 where the light is filtered by color filters to sequentially provide a series of different colors. An example color wheel is illustrated in FIG. 2. Section 40 may be a red color filter, section 42 a green color filter, and section 44 a blue color filter. The filtered light may then pass through another series of lenses 28, 32, and 34 and directed to a spatial light modulator 36 such as DLP (trademark) to produce a colored image. Since only a fraction of the light produced by the white light source is transmitted through the color wheel, significant intensity is lost.

SUMMARY

A laser light projection system with improved colors. A method for providing improved colors with a laser light projection system.

BRIEF DESCRIPTION OF THE DRAWINGS

FIG. 1 illustrates a transmission light projection system.
FIG. 2 illustrates a color wheel.
FIG. 10 illustrates a colorimetric graph showing unfiltered light from a color wheel and light filtered according to an embodiment.
FIG. 11 illustrates an example stationary dichroic filter embodiment according to principles of the invention.
FIG. 12 illustrates an embodiment of filtered fluoresced red and green light according to an embodiment.
FIGS. 13-15 illustrate examples of the placement of a dichroic color filter wheel in the optical path of a laser light transmission projection system embodiment according to principles of the invention.
FIGS. 16-20 illustrate embodiments of the placement of a stationary dichroic color filter in the optical path of a laser light transmission projection system according to principles of the invention.
FIGS. 21-23 illustrate embodiments of the placement of a dichroic color filter wheel in the optical path of a laser light reflection projection system according to principles of the invention.

DETAILED DESCRIPTION OF EXAMPLE EMBODIMENTS

Figure 4:
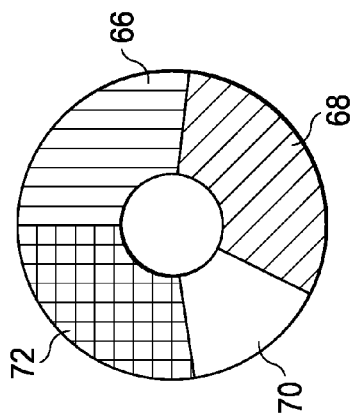
FIG. 4 illustrates a color wheel.
Figure 3:
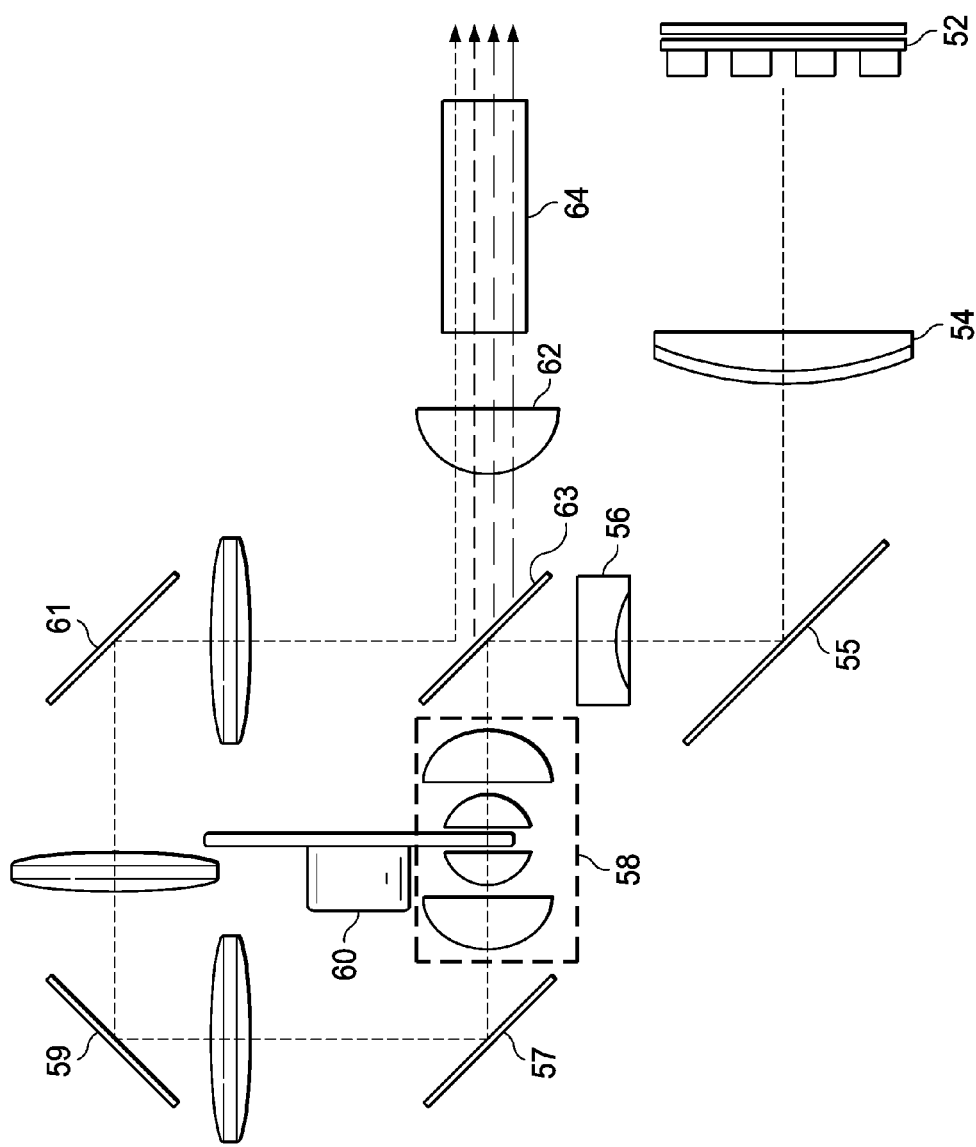
FIG. 3 illustrates a reflective light projection system.

As disclosed in copending application Ser. No. 13/652,129, filed Oct. 15, 2012, and Provisional Application No. 61/546,915, filed Oct. 13, 2011, the entireties of both of which are hereby incorporated by reference, the broadband white light source may be replaced with a laser and the color filters in the color wheel may be replaced by phosphors which fluoresce at a second wavelength when illuminated with a first, shorter wavelength. The phosphors may be very efficient and may down-convert more than 90% of the incident shorter wavelength laser light to a desired longer wavelength color, thereby significantly increasing intensity. In one example color wheel of FIG. 2 section 40 may be coated with a red fluorescing phosphor, section 42 with a green fluorescing phosphor, and section 44 may be coated with a blue fluorescing phosphor. When illuminated with a UV laser, each section may produce brilliant colored light of high intensity. In another example, color wheel section 40 may be coated with a red fluorescing phosphor, section 42 with a green fluorescing phosphor, and section 44 may be transparent. When illuminated with a blue laser, sections 40 and 42 may fluoresce brilliant intense red and green colored light and section 44 may pass the brilliant intense blue laser color.

The laser light that hits a fluorescing phosphor is collimated, but the longer wavelength light that fluoresces is uncollimated. In the example transmission projection light source shown in FIG. 1, a portion of the fluorescing light may be emitted in directions out of the optical path resulting in a reduced intensity. In addition, although phosphors are highly efficient and may convert over 90% of the incident laser light to a longer wavelength color, a small amount of the incident laser light may pass through the color wheel and contaminate the longer wavelength color.

The example reflection projection light source shown in FIG. 2 provides increased intensity by capturing more of the fluorescing light. Light from laser source 52 travels through lenses 54, 56 and 58 and reflects off mirrors 55 and 63 on its way to color wheel 60. For illustration purposes a blue laser light source 52 is assumed. Mirror 63 reflects the blue laser light, but transmits longer wavelength light. The mirror 63 may be made of a high thermal conductivity material such as metal with a mirror surface onto which phosphors are attached. Phosphors may heat up when illuminated by the laser light resulting in reduced fluorescence due to thermal quenching. Unlike transmission color wheels which are made of transparent material that normally has low thermal conductivity, the reflection projection light source may be made of metal which helps cool the phosphor, thereby reducing thermal quenching. Light fluoresced in the forward direction enters the optical path. Light that is fluoresced in the backward direction is reflected by the mirror surface of the mirror 63 into the optical path enabling higher intensity light from a reflection projection light source than is possible with a transmission projection light source. As the phosphor mirror 63 spins, a red phosphor section such as section 66 in FIG. 4 may be illuminated by the blue laser light and fluoresce red light which passes through lenses 56 and 62 and through mirror 63 which is transparent to red light and into light tunnel 64. Similarly a green phosphor such as section 68 or a yellow phosphor such as in 72 may be illuminated by the blue laser light and fluoresce their respective colors. Yellow phosphors 72 may also be used to provide a more brilliant white color if desired.

Section 70 of the color wheel 60 may be transparent or translucent allowing the blue laser 52 light to pass through and into the optical path formed by mirrors 57, 59, and 61. The light is directed to the backside of mirror 63 where it reflects off the mirror into lens 62 and light tunnel 64.

Figure 5:
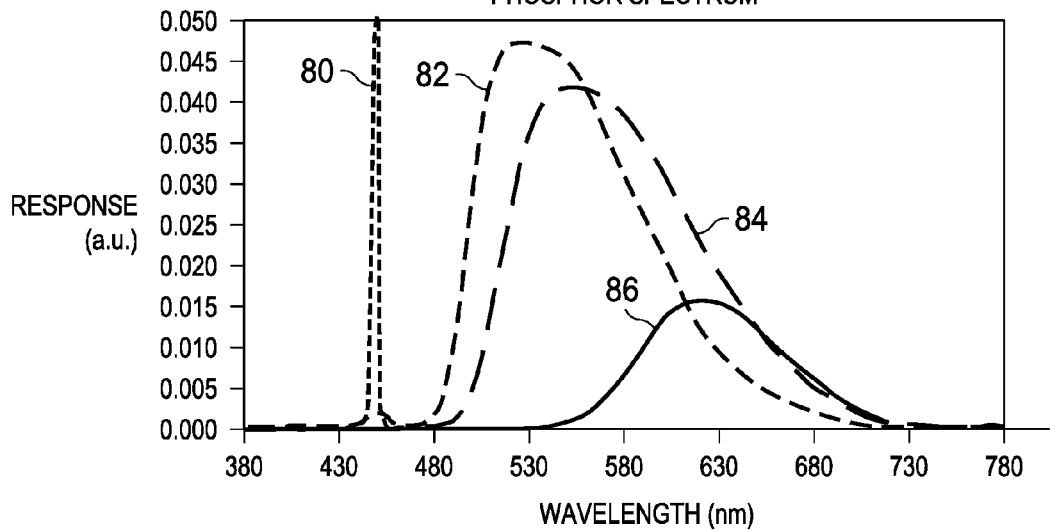
FIG. 5 illustrates the spectra from red, green, and yellow phosphors as well as blue laser light.

As shown in FIG. 5, the blue laser light is monochromatic 80 providing an optimal blue color, whereas fluoresced colors green 82, yellow 84, and red 86 are typically broadband and may not provide the optimum color for forming color images.

While light produced by a laser and laser fluorescence in a projection light source may be intense, the colors may be less than ideal because of the broadband nature of fluoresced light.

While the blue laser outputs light peaks very narrowly around a wavelength of about 450 nm as shown in FIG. 5, light produced by fluorescence spans a broader range of wavelengths. For example green fluorescing light may span wavelengths from about 480 nm to 650 nm, yellow fluorescing light may span wavelengths from about 500 nm to 700 nm, and red fluorescing light may span wavelengths from about 550 nm to 720 nm. The longer wavelength fluoresced light mixed in with the green fluoresced light degrades the green color and the shorter wavelength fluoresced light mixed in with the red fluoresced light degrades the red color. The disclosed example embodiments provide means of improving the color quality.

Figure 6:
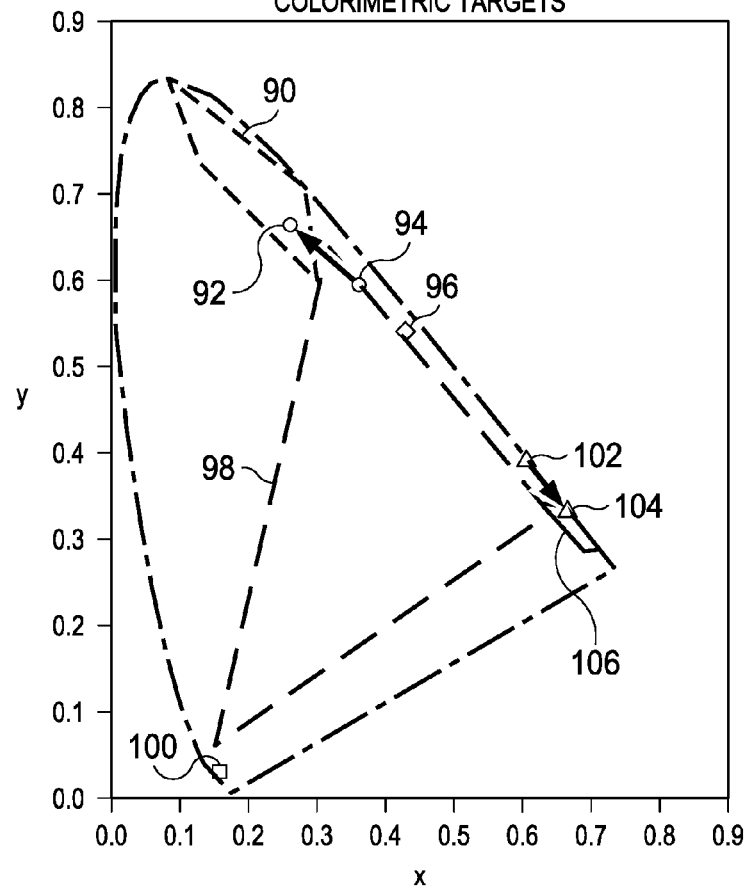
FIG. 6 illustrates a colorimetric graph showing unfiltered light from a color wheel and light filtered according to an embodiment.

A colorimetric graph is shown in FIG. 6. It is desirable to have the green color in quadrilateral 90, the yellow color in triangle 96, and the red color in quadrilateral 106. The green color produced by a typical green fluorescing phosphor is located at point 94 on the colorimetric graph, the yellow color produced by a typical yellow fluorescing phosphor at point 96, and the red color produced by a typical fluorescing phosphor at point 100. The light produced by the blue laser is located at point 98 on the colorimetric graph. While the blue color 98 and yellow color 96 are in desirable locations on the colorimetric graph, the green 94 and red 100 colors are not.

Figure 7:
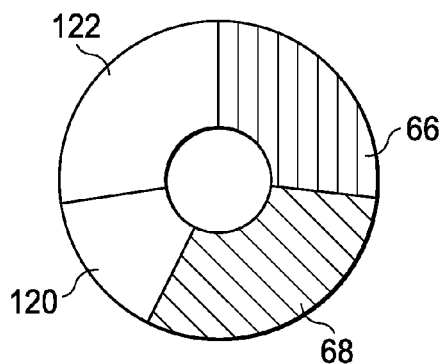
FIG. 7 illustrates an example filter color wheel embodiment of the principles of the invention.
Figure 8:
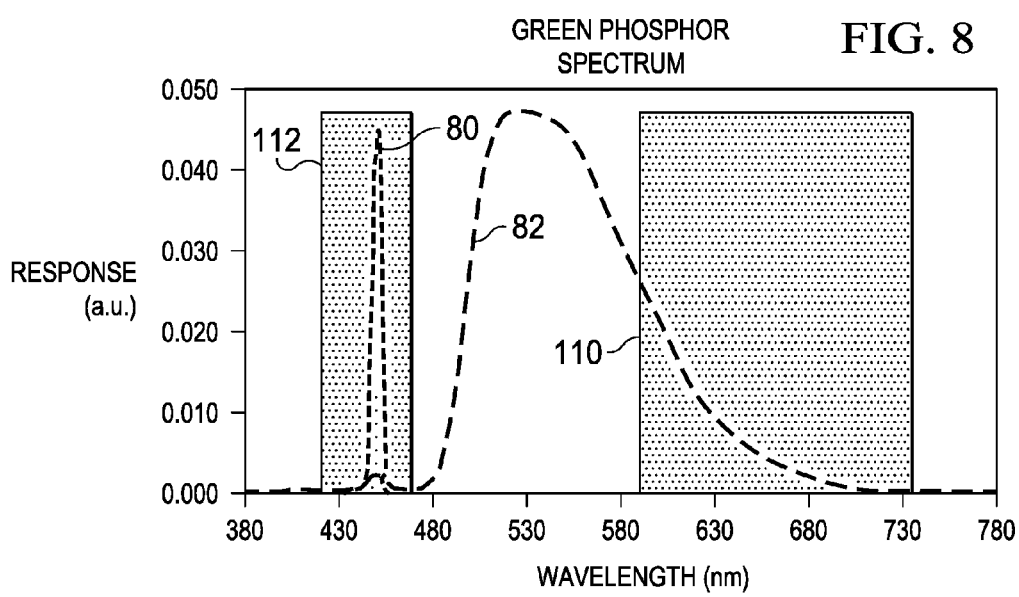
FIG. 8 illustrates an example of filtered fluoresced green light according to an embodiment.
Figure 9:
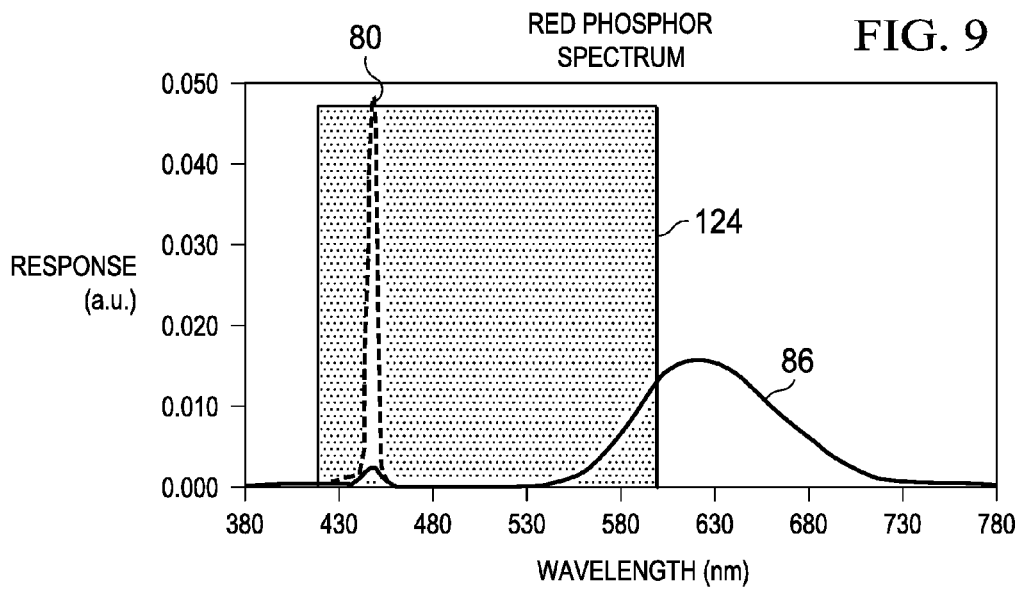
FIG. 9 illustrates an example of filtered fluoresced red light according to an embodiment.

An embodiment filter which may improve the red and green colors is illustrated in FIGS. 7-9. Since the blue and yellow colors are acceptable, sections 120 and 122 in the color filter wheel in FIG. 7 which correspond to the blue 70 and yellow 72 portions of the color wheel in FIG. 4 may be transparent. Section 118 in color filter wheel which corresponds to the green portion of the color 68 wheel may filter out a portion 110 of the green phosphor fluorescence as shown in FIG. 8. In an example embodiment a filter which removes wavelengths longer than a given valuet or removes wavelengths in the range between given values may be used. This moves the green color from location 94 to location 92 on the colorimetric graph in FIG. 6. Location 92 is now within the desired green quadrilateral 90.

For a transmission light projection system it may be desirable to also add blue light filtering 114 to produce more pure green light. Even though greater than 90% of the blue laser light 80 incident on the green phosphor 118 may be converted to longer wavelength fluorescence, a small amount of the blue laser light 80 may be transmitted through the color wheel contaminating the green color 82.

Similarly section 116 in the color filter wheel which corresponds to the red section 66 in the color wheel in FIG. 4 may filter out a portion of the shorter wavelength fluorescence 124 as shown in FIG. 9. In an example embodiment, a filter which removes wavelengths shorter a given value or removes wavelengths in the range between given values may be used. For transmission projection light systems it may be desirable to also filter the blue laser light 80 to produce a more pure red light. With the embodiment filtering, red color on the colorimetric graph may be moved from location 100 to location 104 with filtering. Location 104 is now in the desirable red quadrilateral 106.

When yellow phosphor is not used in the color wheel, a stationary filter may be used to reduce cost. As shown in FIG. 12 a stationary color filter may be remove some of the longer wavelengths from the green fluorescence 82 and some of the shorter wavelengths from the red fluorescence 86. In an example embodiment, filter blocking wavelengths between specified values may be used. With this filter, the location of the green color on the colorimetric graph may be improved from location 134 to location 132 and the location of the red color may be improved from location 136 to location 138. The green color 82 is now located in the desirable green quadrilateral 130 of the colorimetric graph and red color 86 is now located in the desirable red quadrilateral 140. Since no blue light is filtered during green or red fluorescence there may be a small amount of blue contamination of these colors in a transmission projection light system, but the cost of the stationary filter may be significantly less than the non-stationary filter.

The embodiment filters may be placed at various positions in the optical path of a transmission projection light source after the phosphor color wheel 30 and before the light tunnel 34. The filter color wheel 152 must be synchronized with the phosphor color wheel 30 so that the red filter is in the optical path when red light is fluoresced from the phosphor color wheel, the green filter is in the optical path when green light is fluoresced, and a transparent to translucent portion of the color wheel is in the optical path for the blue and yellow colored light.

In FIG. 13, the color filter 150 is formed as a layer over the phosphors on the color wheel 30. While this may reduce cost by eliminating a second motor for the filter color wheel, covering the phosphor with the color filter insulates the phosphor reducing heat loss thereby enhancing thermal quenching. In addition, typical dichroic color filters have excellent filtering for light incident along an axis perpendicular to the surface of the color filter but filtering rapidly falls off as the angle of incidence becomes off axis. Since phosphors fluoresce light at multiple angles, only the portion of the light that is fluoresced parallel to the optical path may be properly filtered. Also as shown in FIG. 13, the colored light from the laser light projection source may be projected onto a spatial light modulator 36 such as DLP (trademark) to produce a colored image In FIG. 14, the filter color wheel 152 is placed after the last lens 32 in the optical path and before the light tunnel 34. The light is focused down to a small beam that is nearly collimated at this point. This may be a preferred position to place the color filter wheel in the optical path.

In FIG. 15 the filter color wheel 154 is placed between lenses 28 and 32 in the optical path where the light has the best collimation for optimum filtering. The beam is larger in this portion of the optical path so a somewhat bigger filter color wheel 154 may be required.

If yellow phosphor is not used, a stationary color filter may be used. As shown in FIGS. 16 through 20, the stationary filter may be positioned at a number of different places in the optical path of a transmission projection light source. A fixed color filter may significantly reduce cost by eliminating the need for a second filter color wheel motor.

As shown in FIGS. 16, 18, and 20 the stationary dichroic color filter 156, 160, and 164 may be formed on the surface of a lens 28 and 32 or on the entrance to the light tunnel 34.

In FIG. 17 the stationary dichroic filter 158 may be placed in the optical path where light is most uniformly collimated for best filtering.

In FIG. 19 the dichroic filter 162 is placed after the final lens 32 in the optical path and before the light tunnel 34. This position may be the preferred position to place the stationary dichroic filter.

As is the case with the transmission projection light source, the embodiment dichroic filters may be placed at various positions in the optical path of a reflection projection light source to filter light after it leaves the phosphor color wheel 60.

In FIG. 21, the dichroic color filters 166 are attached to the color wheel 60 over the color phosphor regions. This may be the most cost effective because it eliminates the need for a second filter color wheel motor, but intensity may suffer due to reduced heat dissipation from the phosphor causing thermal quenching. In addition, filtering may be degraded because the fluoresced light is largely uncollimated at this point in the optical path. Also as shown in FIG. 21, the light beam from the reflection projection light source may be projected a spatial light modulator 36 such as DLP (trademark) to produce a colored image.

Figure 22:
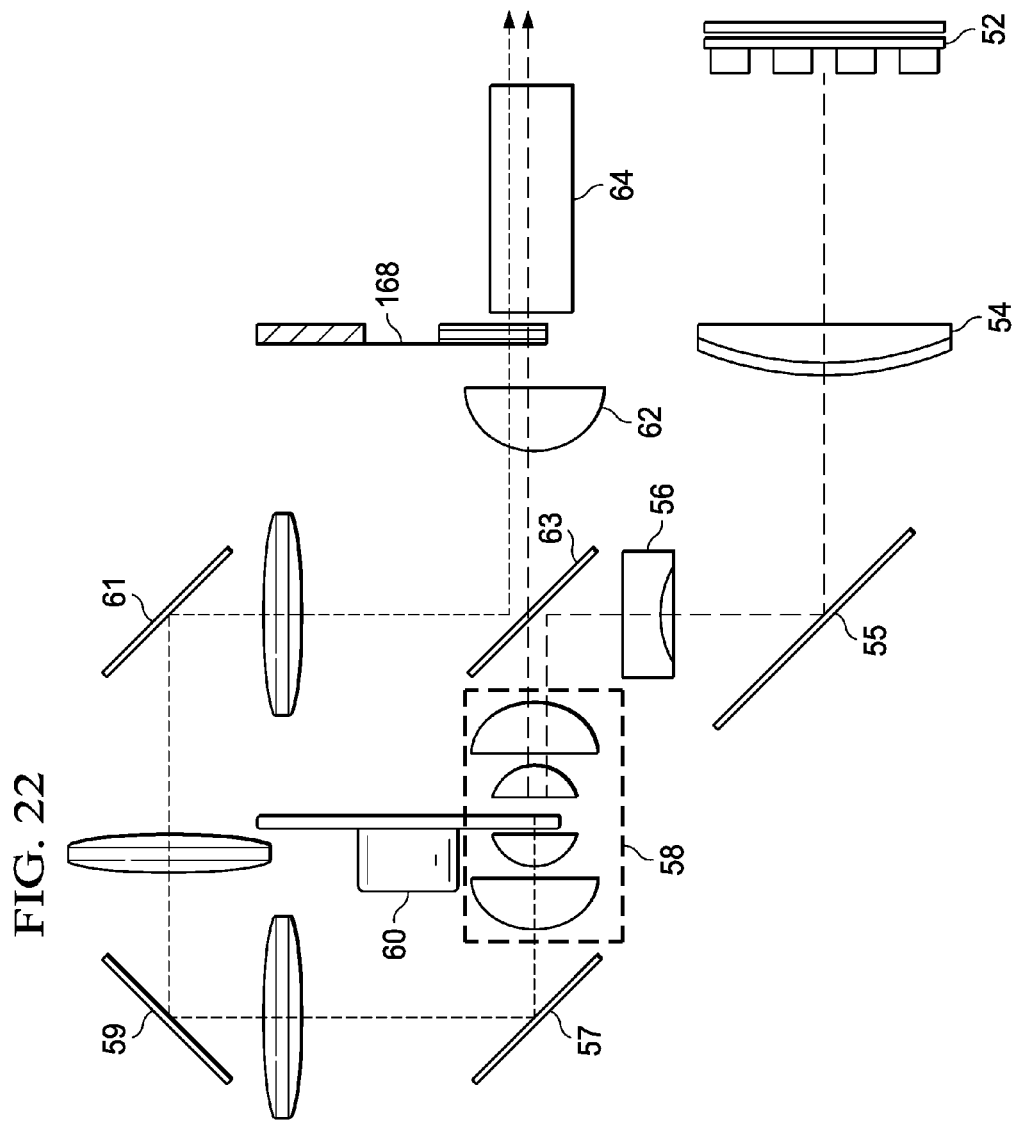

In FIG. 22 the dichroic color wheel 168 is placed after the last lens 62 of the reflection light source and before the light tunnel 64. The light beam may be focused to a small beam at this point and is largely collimated. This may be the preferred location for the dichroic color filter 168.

Figure 23:
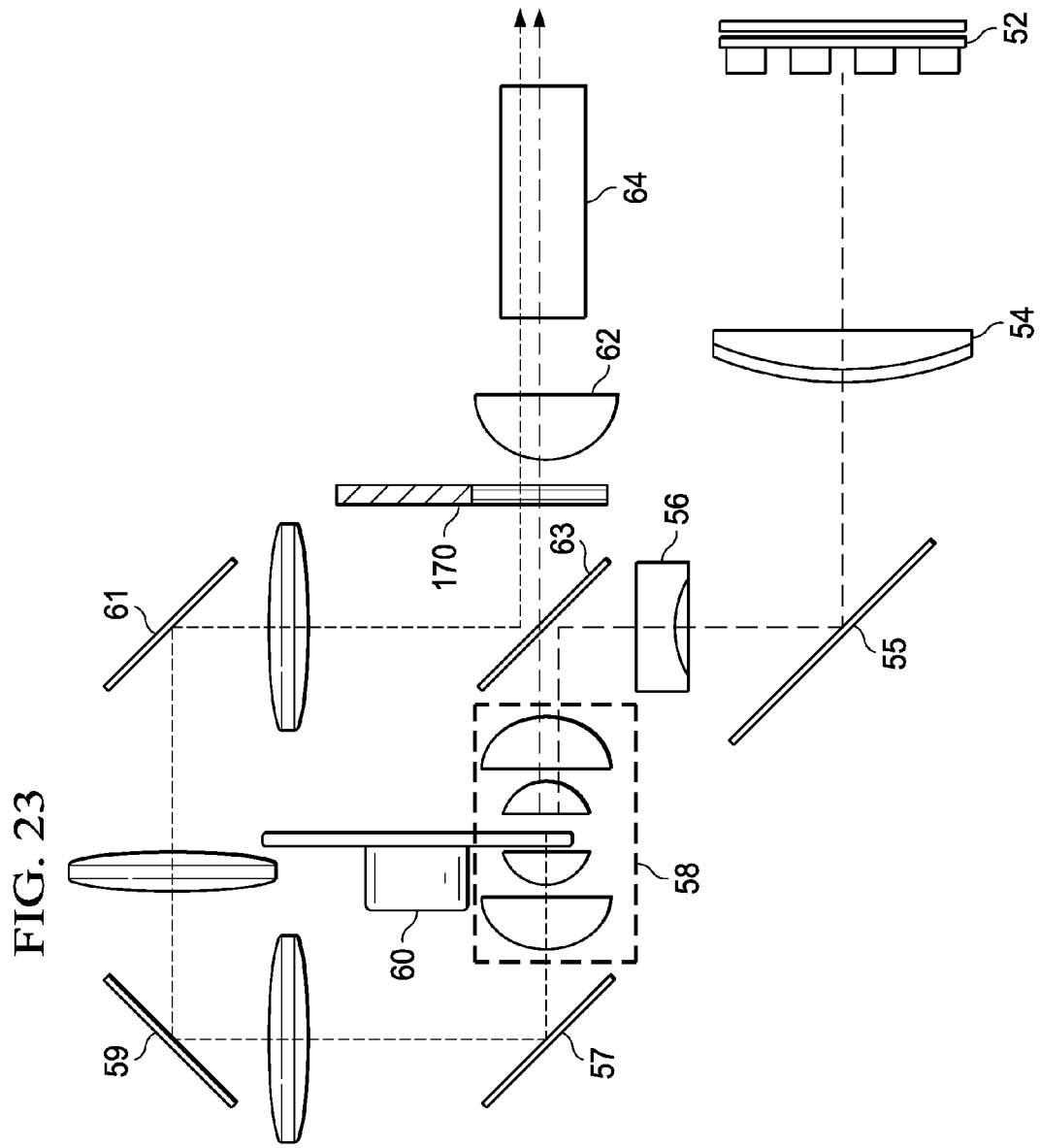

In FIG. 23 the filter is placed in a portion of the optical path between the mirror 63 and the last lens 62 where the light is uniformly collimated. The light beam may be larger in this region of the optical path and may require a bigger dichroic color wheel 170.

As with the transmission projection light source, when yellow phosphor is not used in the color wheel 60 a stationary dichroic filter may be used to reduce cost. A stationary dichroic filter may be placed at various positions in the optical path as shown in FIGS. 24-28.

Figure 24:
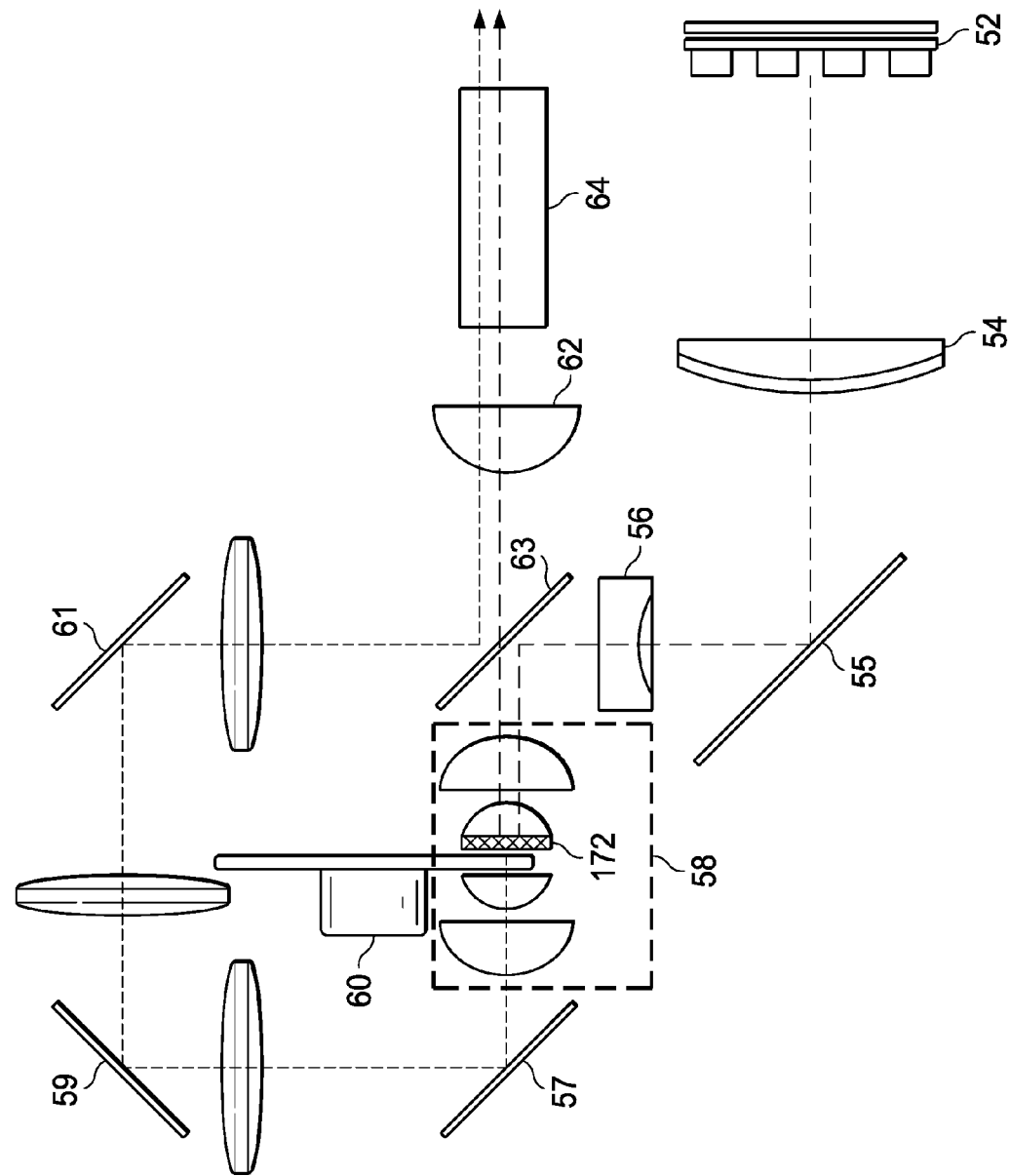
FIGS. 24-28 illustrate embodiments of the placement of a stationary dichroic color filter in the optical path of a laser light reflection projection system according to principles of the invention.
Figure 26:
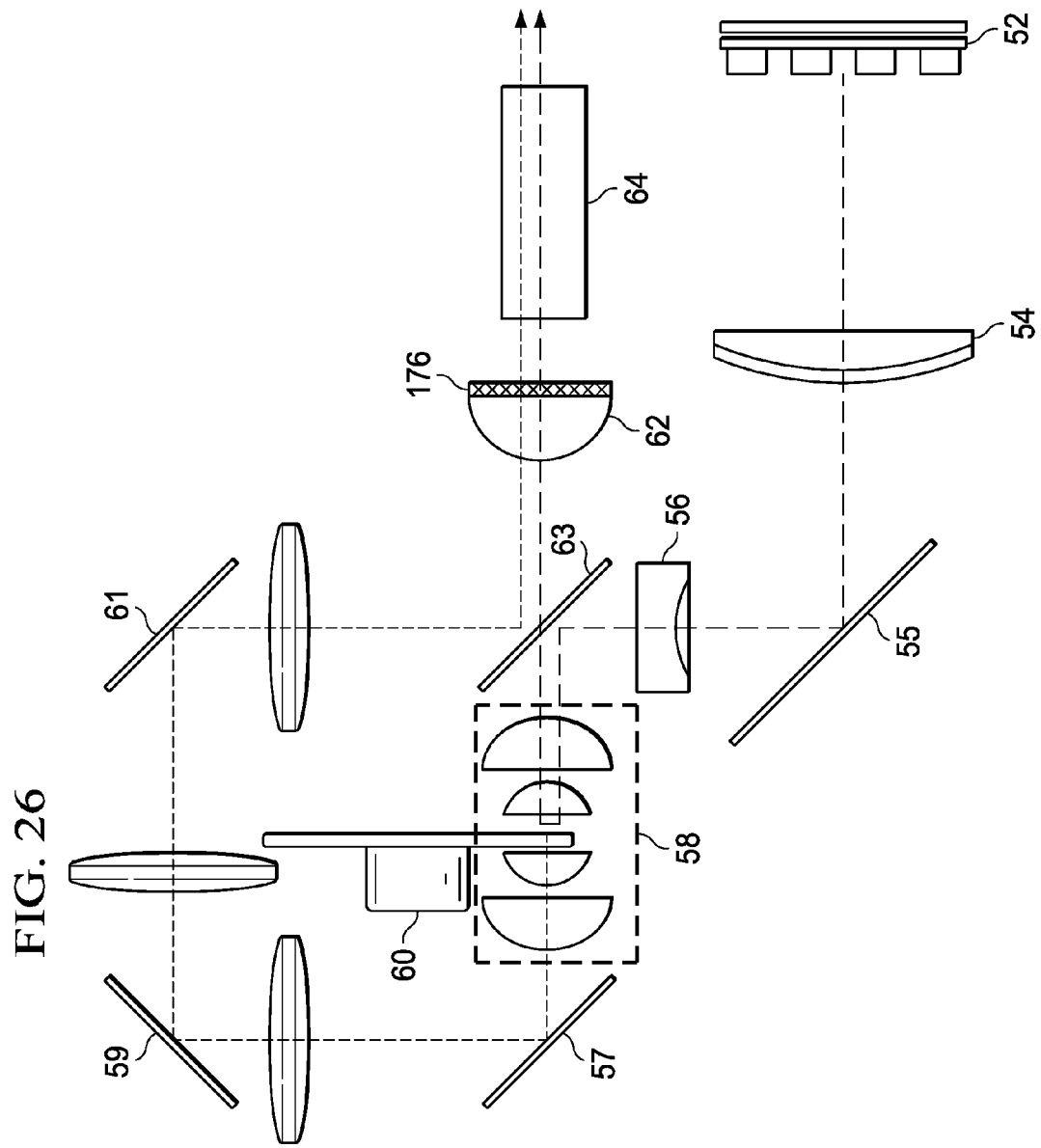
Figure 28:
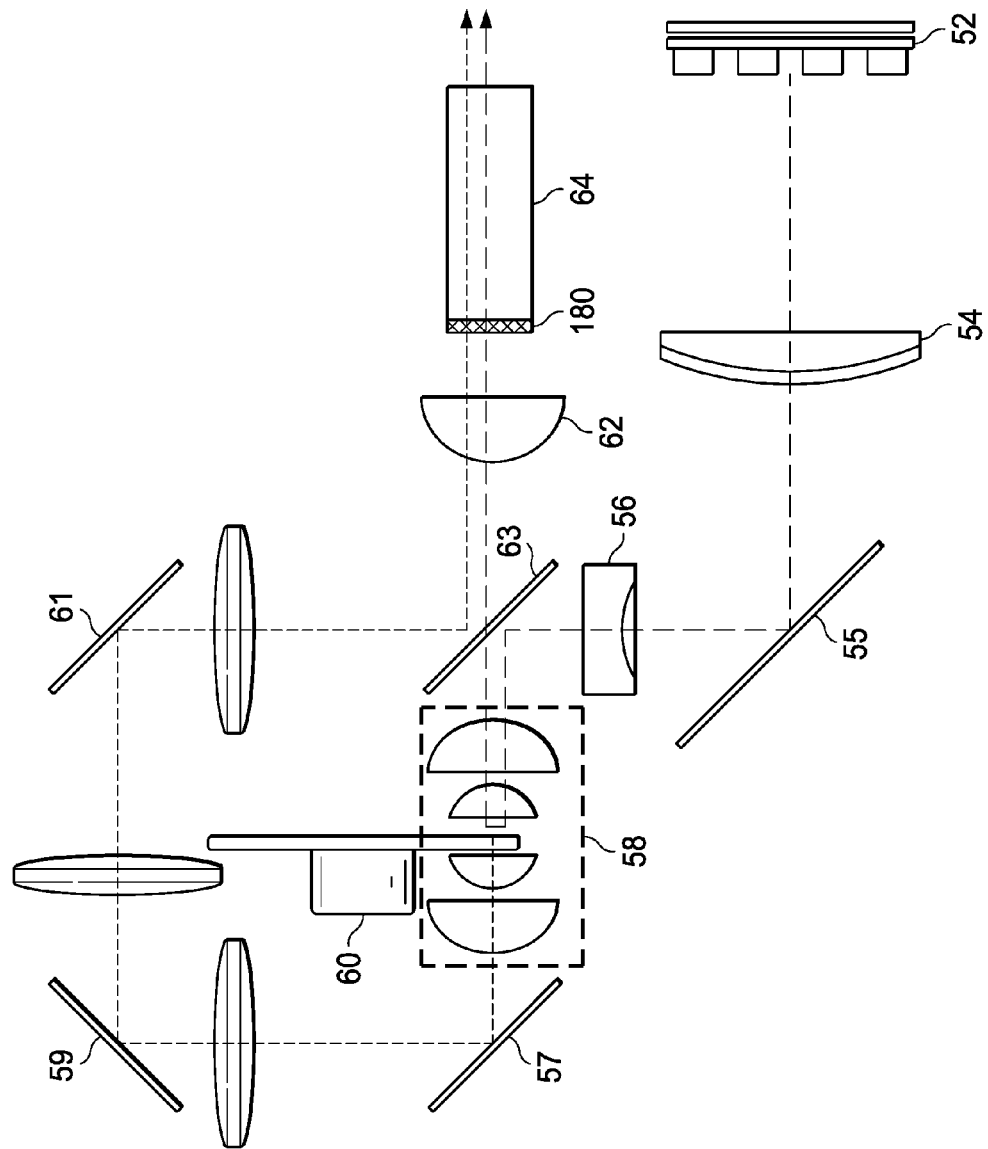

As illustrated in FIGS. 24, 26, and 28, a stationary dichroic filter 172, 176, and 180 may be attached to a lens such as 56 or 62 or to the front surface of the light tunnel 64.

Figure 25:
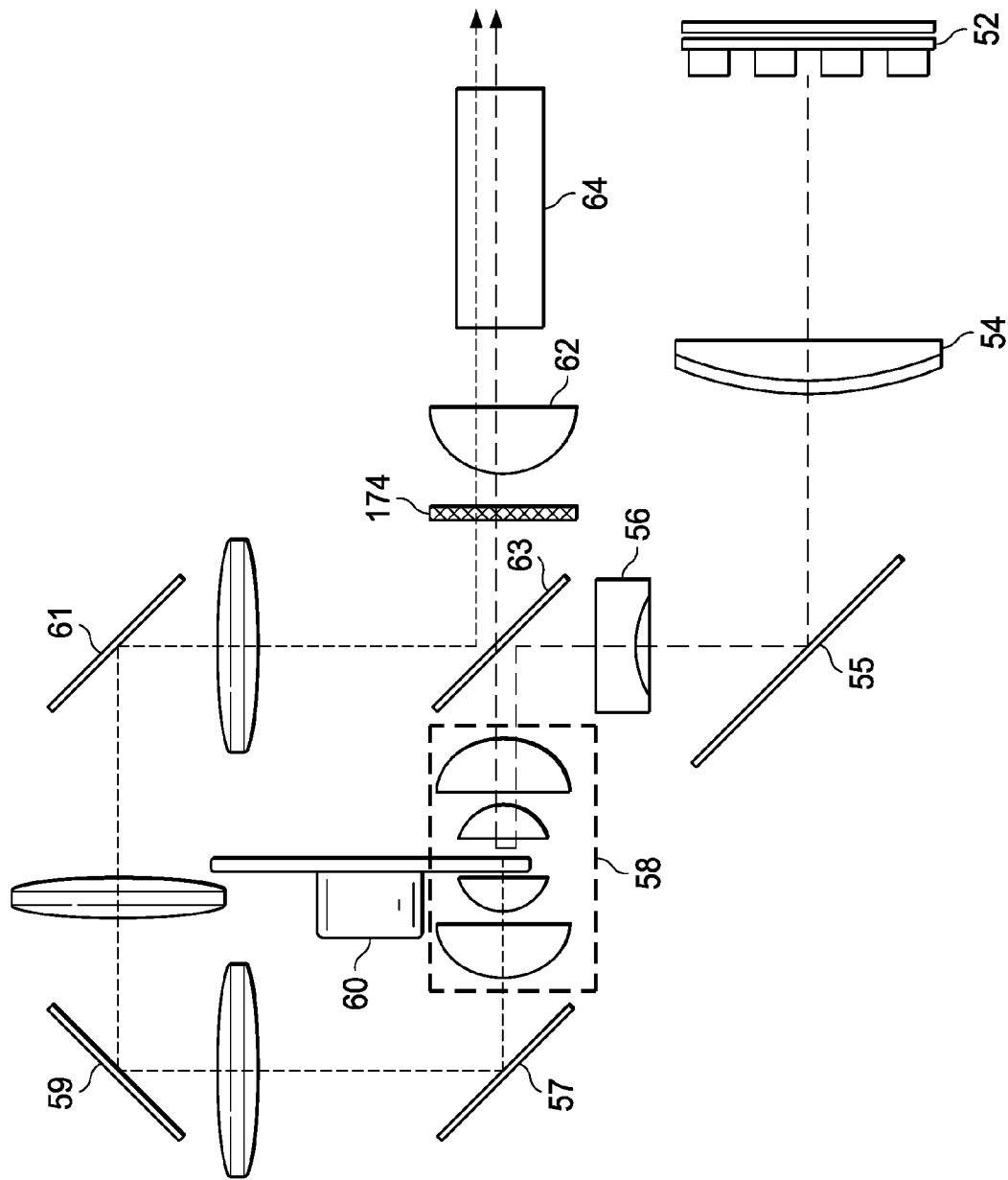

As illustrated in FIG. 25 a stationary dichroic filter 174 may be placed in the optical path between mirror 63 and last lens 62 where the light beam is most collimated. Because the beam may be larger in this region a bigger dichroic filter 174 may be required.

Figure 27:
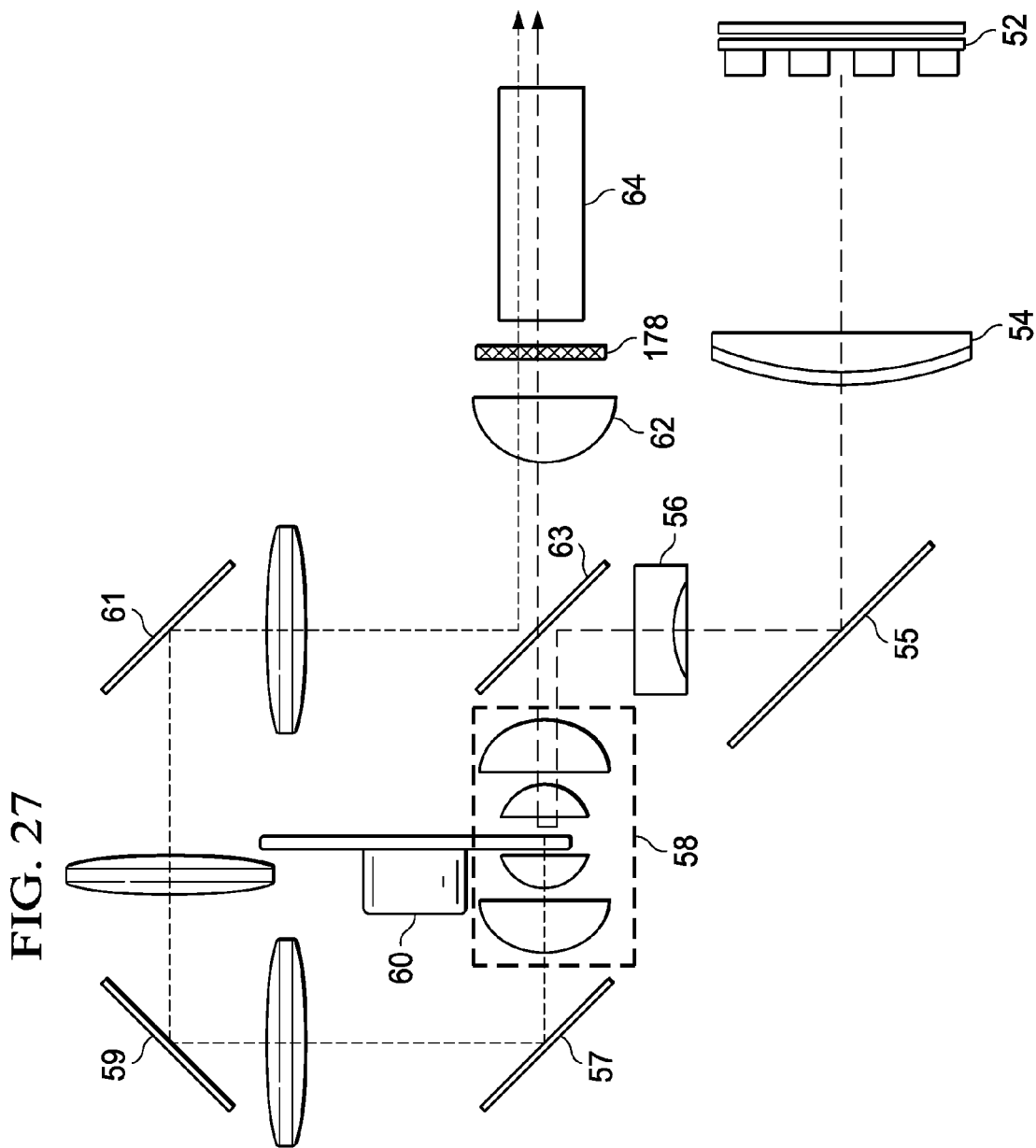

As illustrated in FIG. 27, the dichroic filter 178 may also be placed after the final lens 62 in the optical path of the reflection projection light source and before the light tunnel 64. The light is focused to a narrow beam in this area and is almost collimated. This may be a preferred location to place the stationary dichroic filter 178.

The drawings illustrate some locations where dichroic filters may be placed but do not limit the placement of the dichroic filter to only these locations.

Those skilled in the art to which this invention relates will appreciate that many other embodiments and variations are possible within the scope of the claimed invention.

What is claimed is:

1. A projection light source, comprising: a source of laser light of a first color; a first member including first and second phosphor material segments respectively configured to emit light of second and third colors when illuminated by the laser light of the first color and direct the emitted light to a path; a second member including first and second dichroic filter segments respectively configured to pass the light of the second and third colors emitted by the first and second phosphor material segments, while blocking light of the others of the first, second and third colors; a single mirror positioned between the first member and the second member along the path, the mirror configured to reflect the laser light of the first color from the source to the first member and to reflect the light of the first color from the first member to the second member, and the single mirror configured to transmit the emitted light of the second and third colors to the second member; and apparatus for synchronizing relative placements of the first and second members, to periodically align the first member with the laser light source and the second member with the first member, so that the first dichroic filter segment will pass the second color along the path at first time intervals when the second color is emitted by the first phosphor material and the second dichroic filter segment will pass the third color along at least a same portion of the path at second time intervals when the third color is emitted by the second phosphor material.

2. The projection light source of claim 1, wherein the first member comprises a first rotating member, and the first and second phosphor material segments comprise segments angularly spaced about the first rotating member.

3. The projection light source of claim 2, wherein the second member comprises a second rotating member, and the first and second dichroic filter segments comprise segments angularly spaced about the second rotating member.

4. The projection light source of claim 3, wherein the first color is blue.

5. The projection light source of claim 4, wherein the second color is red.

6. The projection light source of claim 5, wherein the third color is green.

7. The projection light source of claim 1, wherein the second member comprises a rotating member, and the first and second dichroic filter segments comprise segments angularly spaced about the rotating member.

8. The projection light source of claim 1, wherein the first color is blue.

9. The projection light source of claim 1, wherein the second color is a multiprimary color.

10. The projection light source of claim 9, wherein the multiprimary color is yellow.

11. The projection light source of claim 1, further comprising a spatial light modulator positioned along the same portion of the path for modulating light emitted by the first member and passed through the second member.

12. A method for displaying images, comprising: illuminating a first member with light from a source of laser light of a first color; the first member including first and second phosphor material segments respectively configured to emit light of second and third colors when illuminated by the laser light of the first color; directing the emitted light to a path by using the first and second phosphor material segments of the first member; passing light emitted by the first member to a second member while reflecting the laser light of the first color from the source to the first member and reflecting the light of the first color from the first member to the second member using a single mirror placed between the first member and the second member along the path, the second member including first and second dichroic filter segments respectively configured to pass the light of the second and third colors emitted by the first and second phosphor material segments, while blocking light of the others of the first, second and third colors; and synchronizing relative placements of the first and second members, to periodically align the first member with the laser light source and the second member with the first member, so that the first dichroic filter segment passes the second color along the path at first time intervals when the second color is emitted by the first phosphor material and the second dichroic filter segment passes the third color along at least a same portion of the path at second time intervals when the third color is emitted by the second phosphor material.

13. The method of claim 12, wherein the first member comprises a first rotatable member having first and second phosphor material segments angularly spaced; and the synchronizing comprises rotating the first rotatable member.

14. The method of claim 13, wherein the second member comprises a second rotatable member having first and second dichroic filter segments angularly spaced; and the synchronizing comprises rotating the second rotatable member.

15. The method of claim 14, wherein the first color is blue.

16. The method of claim 15, wherein the second color is red.

17. The method of claim 16, wherein the third color is green.

18. The method of claim 15, wherein the second color is a multiprimary color.

19. The method of claim 12, further comprising modulating light emitted by the first member and passed through the second member using a spatial light modulator.

20. The method of claim 12, wherein the first color is blue.

* * * * *